US008646677B2

(12) United States Patent
Beringer et al.

(10) Patent No.: US 8,646,677 B2
(45) Date of Patent: Feb. 11, 2014

(54) METHOD OF JOINING GRAPHITE FIBERS TO A SUBSTRATE

(75) Inventors: Durwood M. Beringer, Suffield, CT (US); Mark E. Caron, Somers, CT (US); Edmund P. Taddey, West Springfield, MA (US); Brian P. Gleason, South Windsor, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 0 days.

(21) Appl. No.: 13/534,692

(22) Filed: Jun. 27, 2012

(65) Prior Publication Data

US 2012/0267421 A1    Oct. 25, 2012

Related U.S. Application Data

(63) Continuation-in-part of application No. 12/623,705, filed on Nov. 23, 2009.

(51) Int. Cl.
*B23K 1/20* (2006.01)

(52) U.S. Cl.
USPC ............... 228/124.1; 228/122.1; 428/634

(58) Field of Classification Search
CPC ..................................... B23K 1/0012
USPC ................ 228/124.1, 122.1; 428/634
See application file for complete search history.

(56) References Cited

U.S. PATENT DOCUMENTS

| | | | |
|---|---|---|---|
| 4,852,645 A | 8/1989 | Coulon et al. | |
| 4,990,402 A | 2/1991 | Kneringer et al. | |
| 5,058,537 A | 10/1991 | Paul et al. | |
| 6,047,876 A | 4/2000 | Smith | |
| 6,616,032 B1 | 9/2003 | Gasse et al. | |
| 6,877,651 B2 | 4/2005 | Sandin | |
| 7,179,558 B2 | 2/2007 | Reisdorf et al. | |
| 7,331,381 B2 | 2/2008 | Wang et al. | |
| 7,380,698 B2 | 6/2008 | Meyer et al. | |
| 7,537,151 B2 | 5/2009 | Bhatti et al. | |
| 2004/0009353 A1* | 1/2004 | Knowles et al. | ........... 428/411.1 |
| 2004/0213975 A1 | 10/2004 | Scott et al. | |
| 2004/0222090 A1 | 11/2004 | Scott et al. | |
| 2005/0183846 A1* | 8/2005 | Mok | ......... 165/104.33 |
| 2007/0284095 A1 | 12/2007 | Wang et al. | |
| 2008/0315401 A1* | 12/2008 | Imamura et al. | ............. 257/712 |

FOREIGN PATENT DOCUMENTS

FR    2814538 A1    3/2002

OTHER PUBLICATIONS

European Search Report; EP 10 25 1978; European Patent Office; Mar. 16, 2011, Munich; 6 pages.
Ip et al., "Wettability of nickel coated graphite by aluminum", Materials Science and Engineering A244 (1998) 31-38, Elsevier, May 16, 1997, 8 pages.

* cited by examiner

*Primary Examiner* — Nicholas P D'Aniello

(74) *Attorney, Agent, or Firm* — Cantor Colburn LLP

(57) ABSTRACT

A method of assembling a metallic-graphite structure includes forming a wetted graphite subassembly by arranging one or more layers of graphite fiber material including a plurality of graphite fibers and applying a layer of metallization material to ends of the plurality of graphite fibers. At least one metallic substrate is secured to the wetted graphite subassembly via the layer of metallization material.

9 Claims, 3 Drawing Sheets

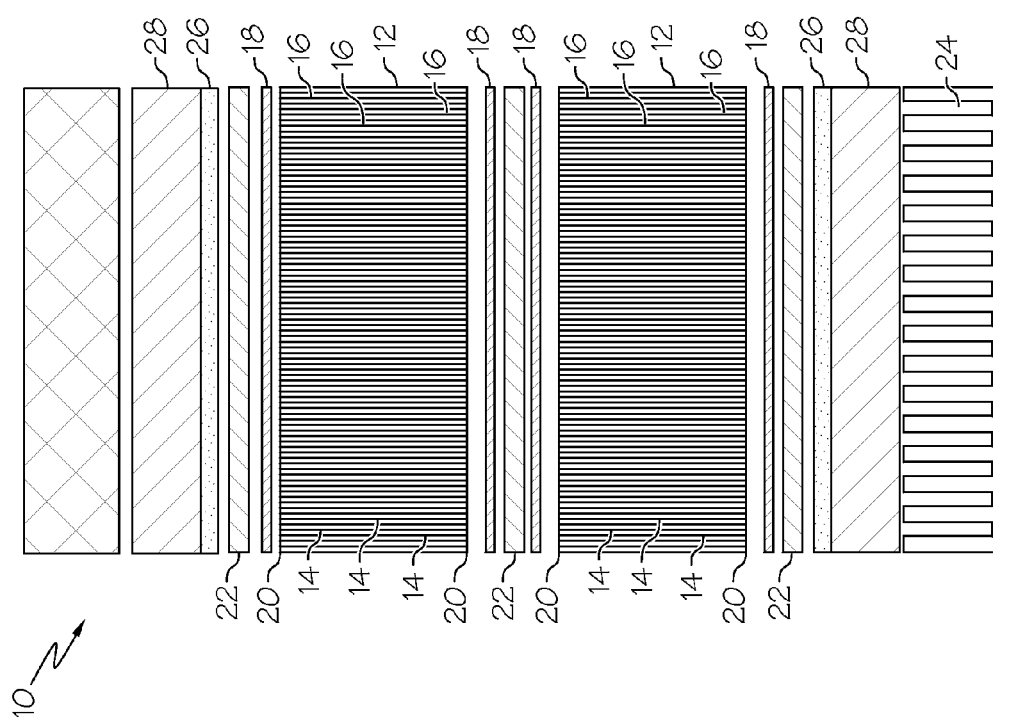

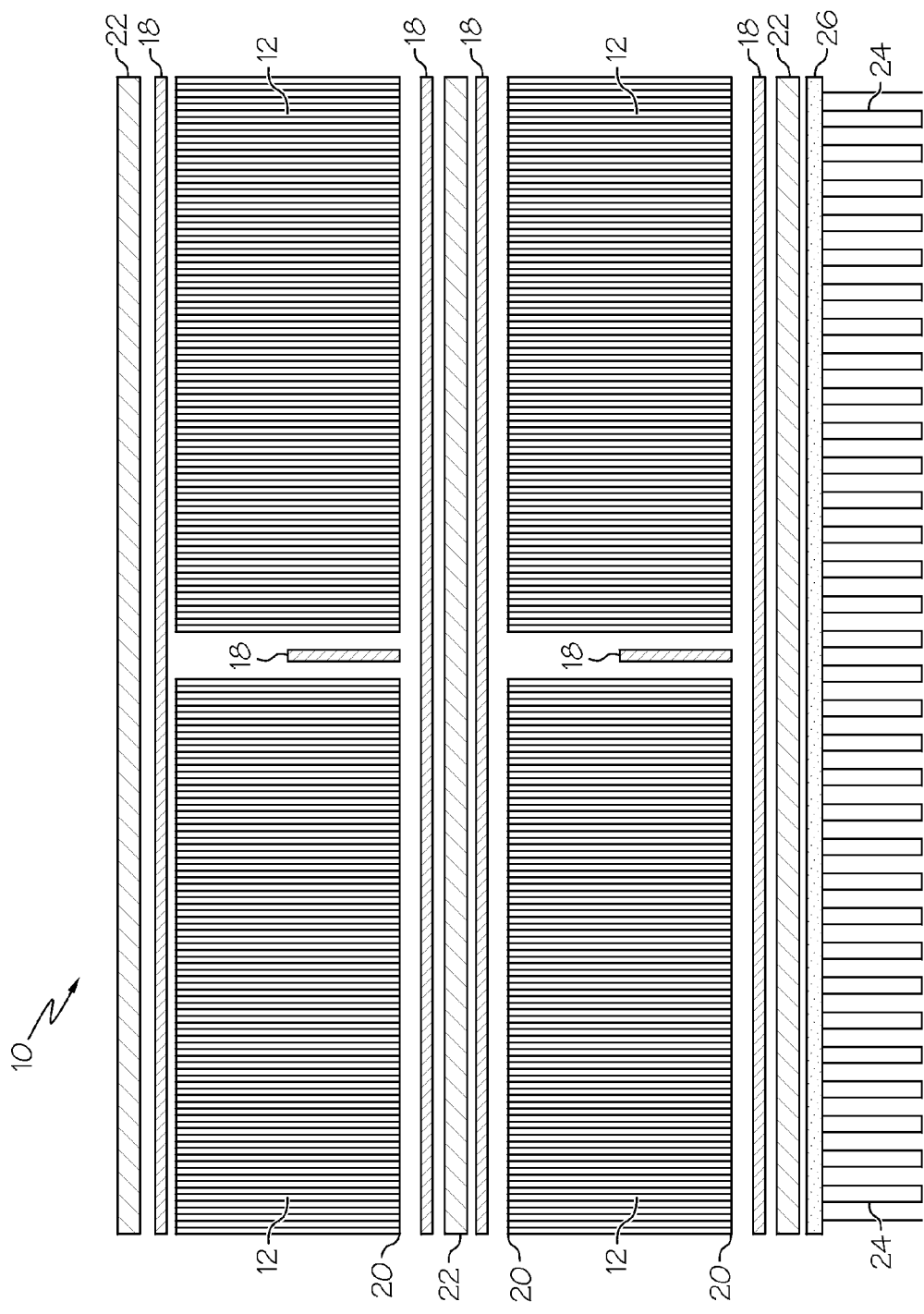

METHOD OF JOINING GRAPHITE FIBERS TO A SUBSTRATE

CROSS-REFERENCE TO RELATED APPLICATION

This patent application is a continuation-in-part and claims priority to U.S. Nonprovisional patent application Ser. No. 12/623,705 filed Nov. 23, 2009, which is incorporated herein by reference in its entirety.

FEDERAL RESEARCH STATEMENT

This invention was made with Government support under United States Government contract DO #3-DO-CRAVE-EC-003R8 awarded by NASA. The Government has certain rights in the invention.

BACKGROUND OF THE INVENTION

The subject matter disclosed herein generally relates to graphite fibers joined to a substrate material. More particularly, the subject matter disclosed herein relates to graphite fiber and substrate structures for heat exchanger systems.

Graphite fiber material, for example, Fibercore®, is often utilized in heat exchange applications. The material comprises an array of graphite fibers having voids between adjacent fibers. In such applications, voids in the material may be filled with a heat storage, or phase change, material such as wax, water or the like. In some applications, no heat storage material is added. Large pieces of the graphite fiber material are typically bonded to a desired surface, for example, an aluminum component, via an adhesive. Thermal mismatch issues are common between bulk graphite and graphite foam when joined to a metallic substrate. For example, graphite materials typically have a coefficient of thermal expansion in the range of about 0-2 $\mu in/in/°$ F., while for metals this coefficient is in the range of about 5-12 $\mu in/in/°$ F. and for polymers the coefficient is in the range of about 10-70 $\mu in/in/°$ F. The graphite fiber material is not a monolithic structure and as such accommodates the thermal mismatch by translating with the substrate during thermal processing. Further, the thickness of the graphite fiber material layer, which is relative to a length of the graphite fibers in the material, is limited due to capability of graphite fiber production. The relatively thin graphite fiber material is fragile and is subject to breakage and damage when handling and/or shaping by machining or the like into desired shapes. The art would well receive a more robust structure of graphite fiber material, which is not as sensitive to handling and/or other processing and which improves the thermal mismatch issues that exist in current structures. Also, in this process, a multilayered graphite fiber material structure may be obtained.

BRIEF DESCRIPTION OF THE INVENTION

According to one aspect of the invention, a method of assembling a metallic-graphite structure includes forming a wetted graphite subassembly by arranging one or more layers of graphite fiber material including a plurality of graphite fibers and applying a layer of metallization material to ends of the plurality of graphite fibers. At least one metallic substrate is secured to the wetted graphite subassembly via the layer of metallization material.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a cross-sectional view of another embodiment of a graphite fiber heat dissipative structure; and FIG. 3 is a cross-sectional view of yet another embodiment of a graphite fiber heat dissipative structure.

Figure 1:
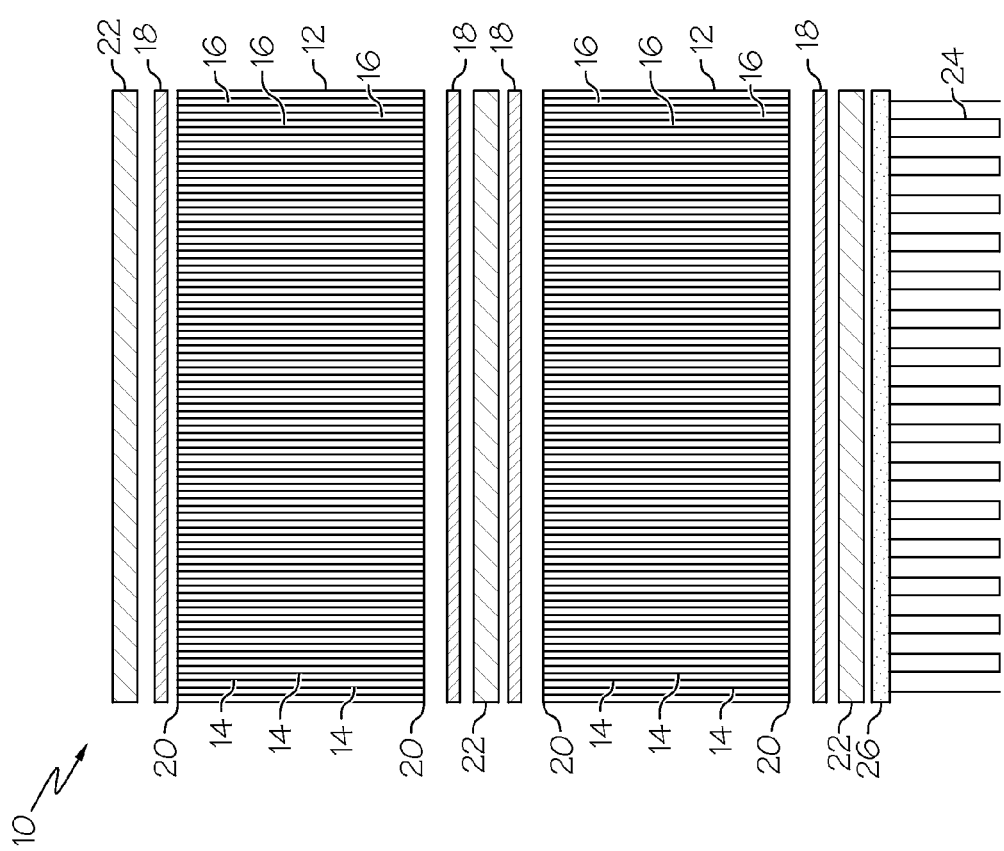
FIG. 1 is a cross-sectional view of an embodiment of a graphite fiber heat dissipative structure.

The detailed description explains embodiments of the invention, together with advantages and features, by way of example with reference to the drawings.

DETAILED DESCRIPTION OF THE INVENTION

Shown in FIG. 1 is a cross-sectional view of an embodiment of a multi-layer graphite fiber material structure 10. The embodiment of FIG. 1 includes two graphite fiber material layers 12, but it is to be appreciated that other quantities of graphite fiber material layers 12, for example, one, three, five or more graphite fiber material layers 12 may be utilized in the structure 10. Each graphite fiber material layer 12 includes a plurality of graphite fibers 14, with a plurality of voids between the graphite fibers 14. In one embodiment, the graphite fibers 14 are approximately 0.40 inches (1.0 cm) long, which results in a graphite fiber material layer 12 thickness of 0.40 inches (1.0 cm). It is to be appreciated, though, that other lengths of graphite fibers 14, resulting in other thicknesses of graphite fiber material layers 12, may be utilized. In embodiments where longer graphite fibers 14 are utilized, the fibers may be arranged with a greater density to resist buckling of the graphite fibers 14.

A layer of braze filler 18, for example a nickel braze alloy filler, is utilized between the graphite fiber material layers 12 to join the graphite fiber material layers 12. In this embodiment, a length of the graphic fibers 14 of the graphite fiber material layer 12 extends substantially from one layer of filler 18 to another layer of filler 18. In some embodiments, at each upper and lower end 20 of the assembly, a metallic sheet 22, which may be a nickel or other suitable material, is brazed to the filler 18. Additionally, in some embodiments, a metallic sheet 22 may be disposed between graphite layers 12 in the assembly. In embodiments where more than one graphite fiber material layer 12 is utilized, brazing of all graphite fiber material layers 12 together may be accomplished in a single step. While the embodiments illustrated utilize a nickel metallic sheet 22 and a nickel braze alloy filler 18, in some embodiments, the metallic sheet 22 may be other nickel-based brazing alloys or of an alloy of titanium and titanium-containing fillers 18 may be utilized therewith. Further, while the filler 18 is shown as a sheet or foil, it is to be appreciated that the filler may be applied in other forms, such as a paste or spray or the like.

The sandwich structure is brazed to a substrate 24 formed from, for example, an aluminum material. Alternatively, the substrate 24 may be formed from other materials, such as stainless steel or nickel alloy where increased fluid combatibility is required, for example in a corrosive fluids environment. Brazing of the metallic sheet 22 to the substrate 24 is accomplished via an aluminum braze alloy 26 or other filler compatible with the substrate (e.g. nickel braze filler for stainless steel) and environment disposed between the metallic sheet 22 and the substrate 24.

In some embodiments, as shown in FIG. 2, an endsheet 28 is located between the metallic sheet 22 and the substrate 24. The endsheet 28 is formed of, for example, aluminum multi-clad, and is brazed to the metallic sheet 22 and the substrate 24 using aluminum braze alloy 26. Further, in some embodiments, an additional aluminum braze alloy layer 26 is utilized between substrate 24 and end sheet 28. While substrate 24 is shown as a plurality of fins, it is to be appreciated that the substrate 24 represents a generic heat transfer device, which may include, for example, fins, a radiator structure, milled or drilled channels, or a radiant surface, or the like. In some embodiments, once the structure is joined as described above a phase heat storage material 16, such as wax or water is infiltrated into the voids between the graphite fibers 14.

While the joining process as described above may be performed in a single step, in other embodiments, the process is performed in two or more steps. For example, referring again to FIG. 2, a subassembly is formed of the graphite fiber material layers 12, the filler 18, and the metallic sheet 22. The filler 18 is applied to ends of the graphite fibers 14 to metallize or wet the graphite fibers 14, which allows for bonding of the graphite fibers 14 to the metallic sheet 22. When the subassembly is completed, it may be set aside, handled, or stored with the metallic sheet 22 acting as a protective layer over the graphite fibers 14. In the second step, the metallized subassembly is joined to the aluminum end sheet 28 via, for example, a vacuum brazing process.

In some embodiments, as shown in FIG. 3, two or more graphite fiber material layers 12 may be arranged side-to-side and joined via brazing. In these embodiments, the metallic sheet 22 is omitted between side-to-side adjacent graphite fiber material layers 12, and only filler 18 is located between sides 30 of adjacent graphite fiber material layers 12. To accomplish the brazing operation, the filler 18 is located between the metallic sheet 22 and each graphite fiber material layers 12, wetting the graphite fibers 14. When joining graphite fiber material layers 12 side-to-side, the filler 18 extends only partially along the length of the graphite fibers 14. Leaving a portion of the joint uncovered by filler 18 allows for more efficient filling of the gaps between graphite fibers 14 with heat storage material 16 in later processing after the graphite fiber material layers 12 are joined. Location of filler 18 may be alternated throughout an assembly to promote flow of the heat storage material 16 through the graphite fiber material layer 12 when filled. As shown in FIG. 3, multiple layers may be constructed once the graphite fiber material layers 12 are joined side-to-side. The stack may include a metallic sheet 22 at the top and/or bottom of the assembly, and optionally a metallic sheet 22 may be disposed between graphite fiber material layers 12. In effect, a large brazed assembly of graphite fiber material layers 12, extending both in thickness and in length/width may be constructed.

The joining of ends of graphite fibers 14 to a metallic sheet 22 into the sandwich structure results in an effectively longer graphite fiber 14 length. The taller graphite fiber material height may be packaged into a more cubic structure (vs. a flat plate) which requires less external support during vibrational loading. Further, the metallic sheet 22/graphite fiber material layer 12 structure is less susceptible to handling damage and can be shaped by a variety of processes, for example, electrical discharge machining (EDM), to produce desired shapes to close tolerances.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of assembling a metallic-graphite structure comprising:
    forming a wetted graphite subassembly by:
        arranging one or more layers of graphite fiber material including a plurality of graphite fibers; and
        applying a layer of metallization material to ends of the plurality of graphite fibers; and
    securing at least one metallic substrate to the wetted graphite subassembly via the layer of metallization material; and
    filling voids between the adjacent graphite fibers of the plurality of graphite fibers with a heat storage material after securing the at least one metallic substrate to the wetted graphite subassembly;
    wherein the heat storage material is one of wax or water.

2. The method of claim 1, wherein the metallization material includes at least one metallic sheet.

3. The method of claim 1, wherein the metallization material is a nickel or titanium containing material.

4. The method of claim 1, wherein the metallic substrate is formed from aluminum or an aluminum-containing alloy.

5. The method of claim 1, wherein the metallic substrate is secured to the wetted graphite subassembly via brazing.

6. The method of claim 1, further comprising arranging two or more layers of graphite fiber material to increase an effective length of the plurality of graphite fibers.

7. The method of claim 6, wherein at least one metallic sheet is disposed between adjacent layers of the two or more layers of graphite fiber material.

8. The method of claim 1, further comprising arranging two or more layers of graphite fiber material side-by-side with a layer of metallization material disposed therebetween.

9. The method of claim 1, wherein the metallic substrate is a heat transfer device.

\* \* \* \* \*